United States Patent
Edwards

[11] Patent Number: 6,164,897
[45] Date of Patent: *Dec. 26, 2000

[54] ADJUSTMENT FOR TOW DOLLY

[76] Inventor: Jerry A Edwards, 140 SE. 99th, Portland, Oreg. 97216

[ * ] Notice: This patent issued on a continued prosecution application filed under 37 CFR 1.53(d), and is subject to the twenty year patent term provisions of 35 U.S.C. 154(a)(2).

[21] Appl. No.: 09/107,935

[22] Filed: Jun. 30, 1998

[51] Int. Cl.$^7$ .................................................. B60P 3/12
[52] U.S. Cl. .......................................... 414/537; 280/402
[58] Field of Search .................................. 414/482, 483, 414/537, 474; 280/402, 656, 789; 180/906

[56] References Cited

U.S. PATENT DOCUMENTS

| | | | |
|---|---|---|---|
| 3,197,230 | 7/1965 | Raimbault | 280/402 |
| 3,338,440 | 8/1967 | Donahue | 414/537 |
| 3,841,506 | 10/1974 | Smith | 280/402 |
| 3,913,934 | 10/1975 | Koehn . | |
| 4,712,967 | 12/1987 | Farthing . | |
| 4,822,069 | 4/1989 | Burgess | 414/537 |
| 4,921,390 | 5/1990 | Baines | 280/402 |
| 5,016,897 | 5/1991 | Kauffman | 414/537 |
| 5,342,162 | 8/1994 | Robinette . | |
| 5,387,001 | 2/1995 | Hull . | |
| 5,391,044 | 2/1995 | Young . | |
| 5,464,243 | 11/1995 | Maiwald et al. | 180/906 |
| 5,540,540 | 7/1996 | Peterson . | |
| 5,727,920 | 3/1998 | Hull et al. | 414/482 |

*Primary Examiner*—Gregory A. Morse
*Attorney, Agent, or Firm*—Robert L. Harrington

[57] ABSTRACT

A tow dolly arranged for towing a vehicle behind another vehicle. The tow dolly has ramps for receiving wheels of the towed vehicle with the ramps being adjustably mounted such that vehicles of different wheel spacing between the front and/or rear wheels may be accommodated. The wheel assemblies are also adjustably mountable to accommodate either a narrow width vehicle or a wide width vehicle. Multiple bores are provided in the main frame to accommodate the two mounting positions of the wheel ramps to accommodate the mounting of the axle assemblies in the two positions.

6 Claims, 4 Drawing Sheets

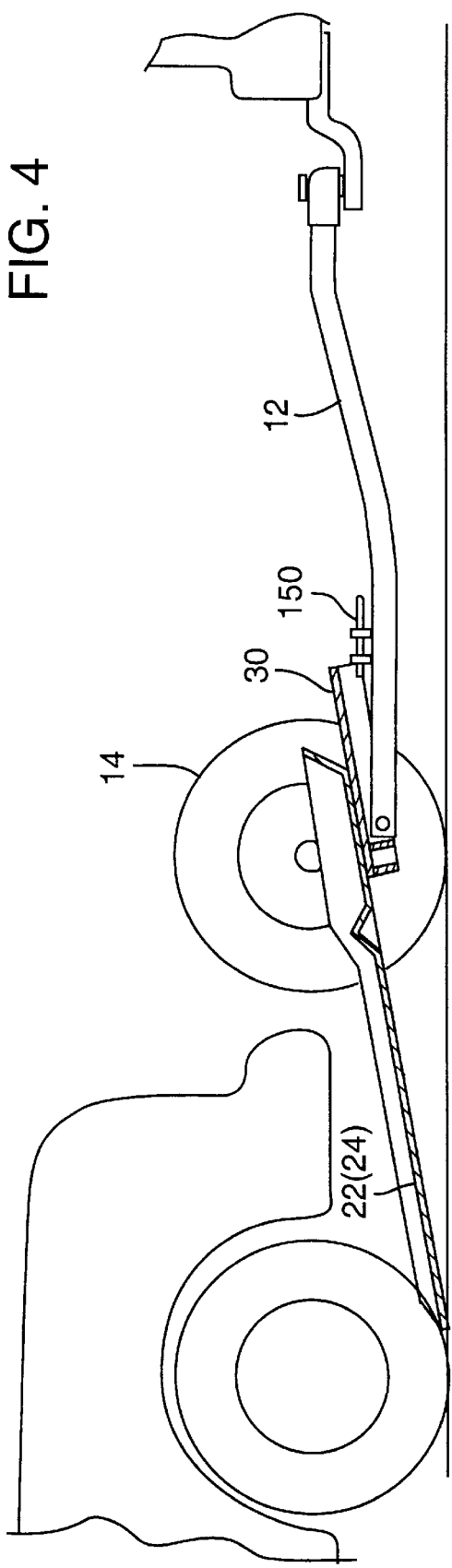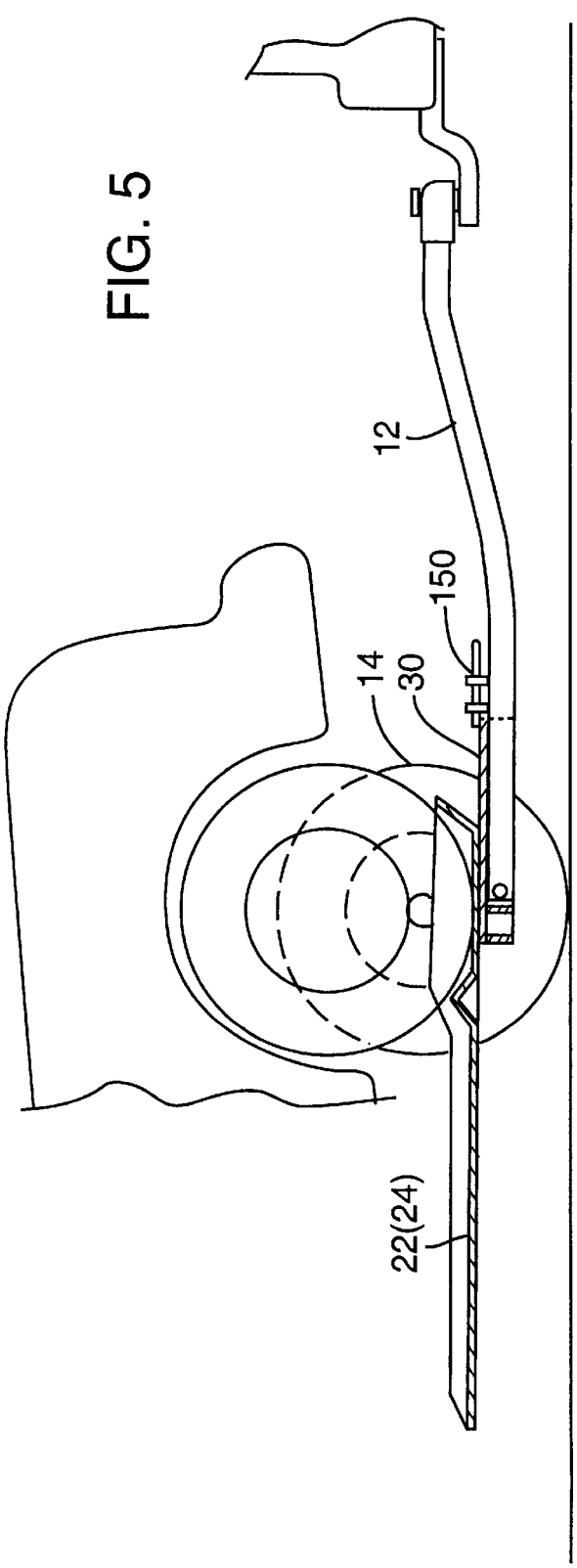

ADJUSTMENT FOR TOW DOLLY

FIELD OF THE INVENTION

This invention relates to a tow dolly for towing vehicles, e.g., for towing a passenger car behind a motor home, and more particularly it relates to an adjustment feature that adjusts to different vehicle sizes.

BACKGROUND OF THE INVENTION

A tow dolly as contemplated herein is a two-wheel trailer having a tow bar that enables it to be towed behind, e.g., a motor home (or any other vehicle equipped with the necessary hitch). A pair of pivotal ramps are located between the wheels of the tow dolly. The ramps are spaced apart so as to receive the front wheels of a vehicle to be towed. The ramps are pivoted down to an inclined position to allow the front wheels of the vehicle to be driven up the ramps and onto the trailer. The ramps are pivoted up for road travel and the vehicle is secured to the trailer. The front wheels ride the trailer while the rear wheels continue to ride on the road and are dragged along the road surface by connection to the trailer.

The above-described towing system typically applies to vehicles having automatic transmission and front-wheel drive. The rear wheels in such case are idler wheels and simply roll down the roadway in a manner very similar to normal driving of the vehicle. The rear wheels may be backed onto the tow dolly for vehicles having an automatic transmission and rear-wheel drive although such is far less common.

A concern for such a towing system is that the tow dolly wheels have to be spaced apart to permit the total width of the car (between the fenders) to reside between the tow dolly wheels. This adds about two feet to the width of the vehicle. Furthermore, the width between the vehicle wheels varies. A tow dolly made to fit a small vehicle having a narrow width may not accommodate a large vehicle and vice versa. The ramps are not the proper width and the wheels of the tow dolly are not spaced far enough apart or they are undesirably too far apart. Prior to the present invention, this problem has been resolved by producing multiple sized tow dollies to accommodate the different vehicle sizes. In such a narrow market, i.e., primarily motor home owners who desire to tow a vehicle having automatic transmission and front-wheel drive, the added inventory costs to the manufacturers and marketers of tow dollies is extensive. It is accordingly an objective of the present invention to provide a tow dolly design that can serve the towing needs for a range of vehicle width sizes.

SUMMARY OF THE INVENTION

The preferred embodiment of the present invention provides adjustment to the width between the wheels of the tow dolly and independent adjustment to the width between the ramps as mounted on the tow dolly. The wheels are adjusted by providing each wheel with a half axle and mounting the axles to a main frame that spans the major distance between the wheels. The wheels rotate relative to the axles and the axles are secured non-rotatively to the main frame. The fastener mechanism allows the axles to be adjusted relative to the main frame to thereby adjust the wheel width.

The ramps are also secured to the main frame using fasteners that permit lateral adjustment. The frame is pivotally attached to a hitch 12 whereby the frame can be pivoted to pivot the ramps between an inclined vehicle loading position and a raised towing position. A locking mechanism locks the main frame to the hitch in the raised position.

The invention will be more fully appreciated upon reference to the following detailed description having reference to the drawings referred to therein.

DESCRIPTION OF THE PREFERRED EMBODIMENT

Figure 1:
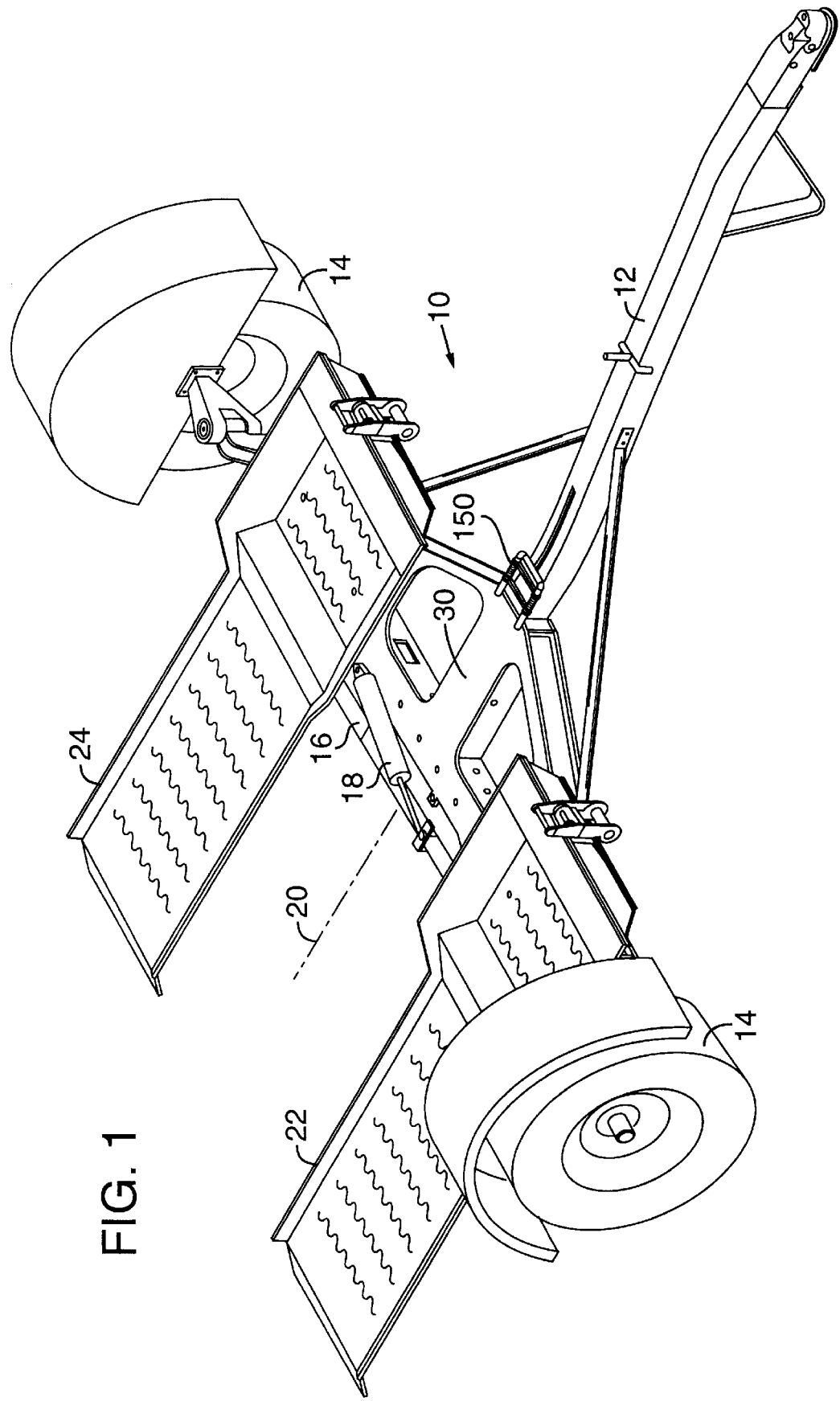
FIG. 1 is a front perspective view of a tow dolly of the present invention.

A tow dolly 10, such as illustrated in FIG. 1, is used to tow one vehicle behind another vehicle. A typical application is to tow a vehicle such as a car behind a motor home. It is known that the vehicles to be towed have different widths between the front wheels and/or the rear wheels. The widths will vary from manufacturer to manufacturer and from model to model. The tow dolly of the present invention is adjustable to accommodate a range of vehicle widths as will be explained.

The tow dolly 10 of FIG. 1 has a hitch 12 for coupling the dolly 10 to a towing vehicle. The dolly 10 is supported on wheels 14 with the wheels 14 being coupled together by a tie rod 16. In this embodiment, the wheels 14 are steerable with the wheels 14 being biased to a central position by a cylinder 18. The tow dolly 10 has a center axis 20 which extends along the length of the hitch 12.

Ramps 22, 24 are provided to receive either the front or the rear wheels of a vehicle that is to be towed. In this embodiment, the ramps 22, 24 are mountable in two different positions. The ramps 22, 24 are mounted at a distance from the center axis 20 to accommodate a narrow width vehicle. The ramps 22, 24 are mounted at a second distance from the center axis 20 to accommodate a wider width vehicle. The axle assemblies on which the wheels 14 are mounted are also mountable in two positions. When the ramps 22, 24 are mounted for a narrow vehicle, that is the ramps 22, 24 are moved to be mounted closer to the center axis 20, the axle assemblies may also be moved inwardly toward the center axis 20 to lessen the overall width of the tow dolly. The mounting of the wheel receiving ramps 22, 24 and the axle assemblies are explained in further detail with reference to FIGS. 2 and 3.

Figure 2:
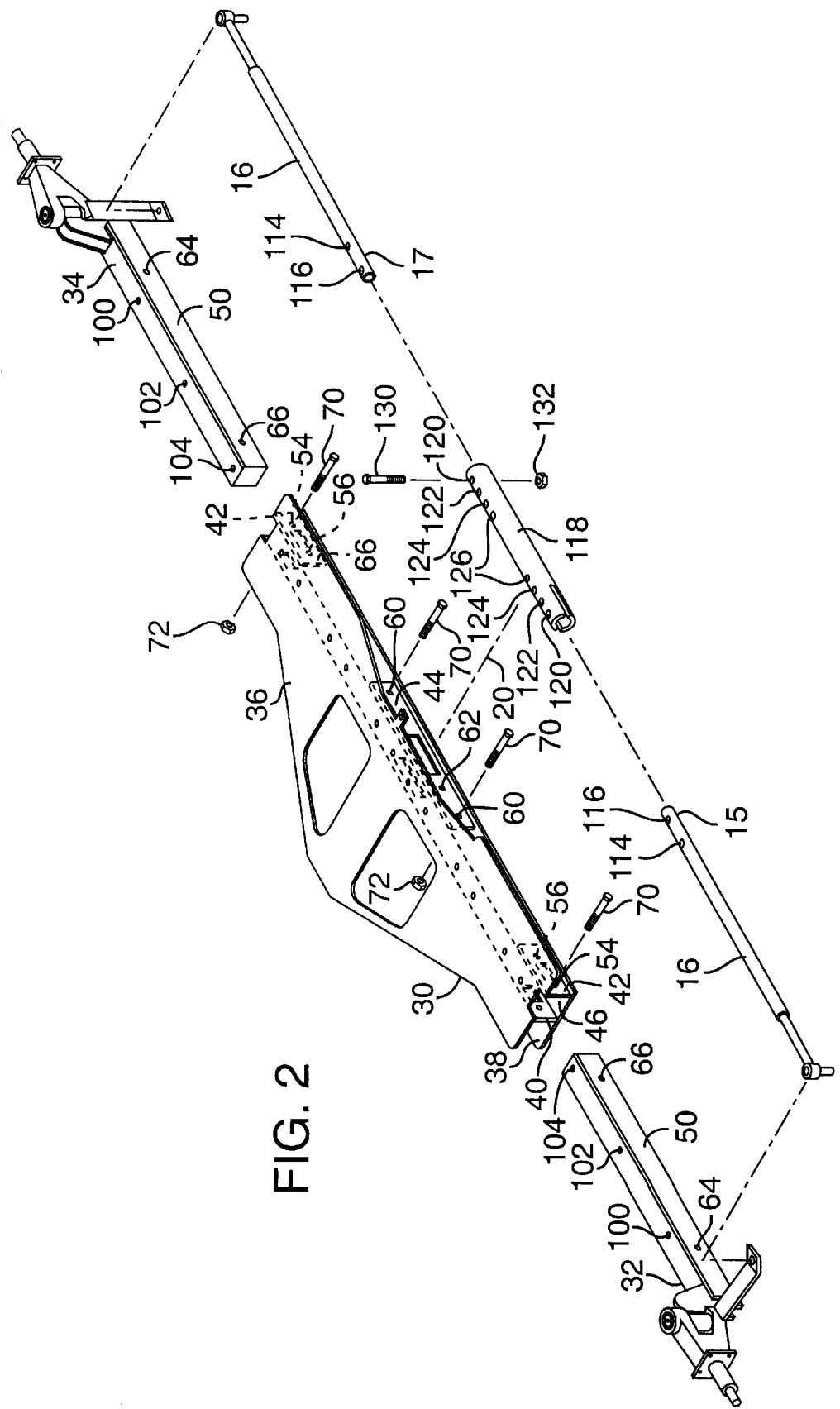
FIG. 2 is an exploded view of a main frame and axle assemblies from a rear perspective view of the tow dolly of FIG. 1.

Refer now to FIG. 2 of the drawings which illustrates a rear view of the main frame 30 and axle assemblies 32, 34. (Certain of the components can be better seen in FIG. 3 which is a front view.) The frame 30 has an upper plate 36 which is joined to a lower plate 38 by a rib 40 that extends along the length of the upper plate 36 and the lower plate 38. Spacer ribs 42 are positioned near each end of the plates 36 and 38 and are spaced at a distance from the rib 40. A center spacer rib 44 is positioned centrally between the upper plate 36 and the lower plate 38 with the center spacer rib 44 being aligned with the end spacer ribs 42. The upper plate 36 and the lower plate 38 are fixedly joined to the connecting ribs 40, 42 and 44 in a conventional manner such as by welding. Additional ribs are provided between the plates 36, 38 to provide structural integrity (see FIG. 3).

The upper plate 36 and the lower plate 38 in combination with the ribs 40, 42, and 44 form a channel 46 for receiving the axle assemblies 32, 34. Each axle assembly 32, 34 has a rectangular beam 50 that is sized to fit in the defined channel 46 of the main frame 30.

Each of the ribs 42 have bores 54, 56. Bores 54, 56 extend through the rib 40. The center rib 44 has bores 60 and 62. Bores 60, 62 extend through the rib 40. Each beam 50 of the axle assemblies 32, 34 have through bores 64, 66.

As previously mentioned, the axle assemblies 32, 34 are mounted in one of two positions, either for a narrow vehicle (including a range of narrower vehicles) or for a wide vehicle (including a range of wider vehicles). To accommodate a narrow vehicle, beams 50 of the axle assemblies 32, 34 are inserted into the channel 46 with the bore 66 of the beam 50 aligned with the bore 62 extending through the center rib 44 and the rib 40 and the bore 64 of the beam 50 aligned with the bore 56 extending through the end rib 42 and the rib 40. This will place the wheels 14 (FIG. 1) closer to the center 20 of the dolly 10.

To accommodate a wider vehicle, the beam 50 of axle assemblies are inserted into the channel 46 such that the bore 66 will be in alignment with the bore 60 and the bore 64 will be in alignment with the bore 54. This will move the wheels 14 a further distance from the center 20 of the dolly 10. The wheels 14 thus in one position are moved inwardly toward the center 20 of the dolly 10 and in the other position the wheels 14 are moved outwardly further from the center 20 of the dolly 10. Conventional fasteners such as bolts 70 fitted in the aligned bores of the beam 50 and the frame 30 secure the axle assemblies 32, 34 to the main frame 30. The bolts 70 are secured in position by nuts 72.

The length of the tie rod 16 is adjusted according to the mounting arrangement of the axle assemblies 32, 34. A sleeve 118 sized to fit on the ends of each section 15 and 17 of the tie rod 16 has through bores 120, 122, 124 and 126. Each tie rod section 15, 17 have through bores 114, and 116. When the axle assemblies 32,34 are mounted to the main frame for a narrow vehicle the sleeve 118 is mounted on the sections 15 and 17 of the tie rod 16 with the bores 122 and 126 aligned with the bores 114 and 116 of the sections 15 and 17. When the axle assemblies 32, 34 are mounted to accommodate a wide vehicle the bores 120, 124 of the sleeve 118 are aligned with the bores 114 and 116 of the sections 15 and 17. Bolts 130 fitted in the aligned bores and secured by a nut 132 secures the sleeve 118 to the sections 15, 17 of the tie rod 16.

Figure 3:
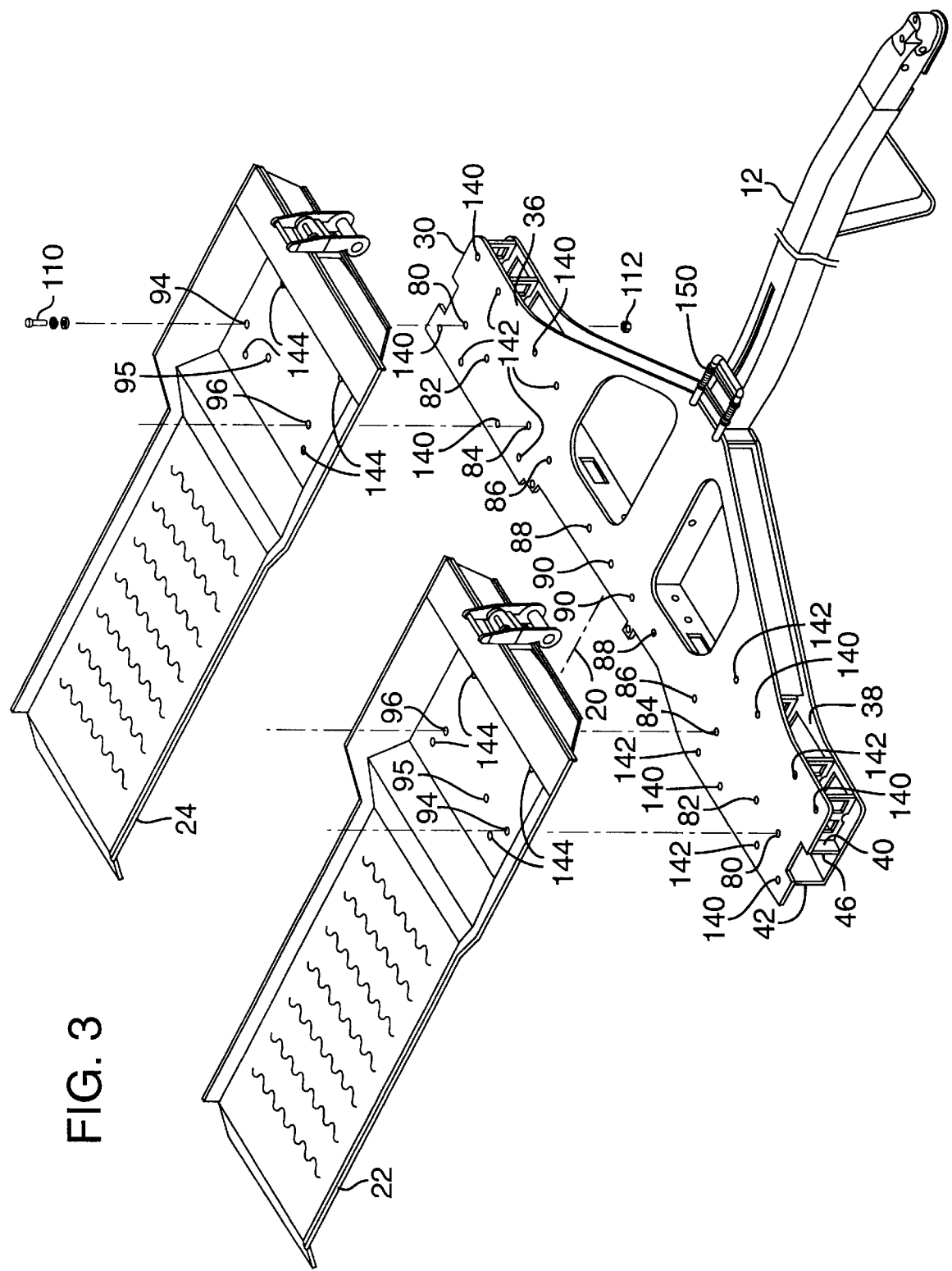
FIG. 3 is an exploded view of the main frame and vehicle wheel receiving ramps and hitch of the tow dolly from a perspective view similar to that of FIG. 1; and, FIGS. 4 and 5 illustrate the tilted position and raised position for loading a vehicle onto the two dolly of FIG. 1.

Refer now to FIG. 3 of the drawings which illustrates the mounting arrangement for the ramps 22, 24. The ramps 22, 24 are mounted in one position for a narrow vehicle (including a range of narrower vehicles) and in another position for a wider vehicle (including a range of wider vehicles). The main frame 30 has multiple bores that extend through the upper plate 36 and the lower plate 38. As shown, the main frame 30 has a row of bores 80, 82, 84, 86, 88 and 90 located from the end to the center at each side of the frame. The main frame 30 also has a first pattern of bores 140 and a second pattern of bores 142. The ramps 22, 24 have bores 94, 95, 96 (which line up with bores 80-90) and a pattern of bores 144 that match the patterned bores 140 or 142 of the main frame 30. As seen in FIG. 2, the beams 50 of the axle assemblies 32, 34 (FIG. 2) have bores 100, 102, 104 that also line up with bores 80–90.

From FIG. 3, the ramps 22, 24 are mountable to the main frame 30 in two positions. The ramps 22, 24 mounted in one position have the patterned bores 144 aligned with the patterned bores 142 of the main frame 30. This mounting position is for the narrow range of vehicles. The ramps 22, 24 mounted in the other position have the patterned bores 144 aligned with the patterned bores 140 of the main frame 30. This position is for the wide range of vehicles.

When the dolly 10 is set up for a narrow vehicle, that is the axle assemblies 32, 34 are mounted inwardly, the bore 104 of the beam 50 (FIG. 2) will be aligned with the bore 90 in the main frame 30 (FIG. 3). This aligns the bore 100 of the beam 50 with the bore 82 of the main frame 30 and the bore 102 of the beam 50 with the bore 86 of the main frame 30. The ramps 22, 24 installed on the main frame 30 to accommodate a narrow vehicle (patterned bores 144 of the ramps aligned with the patterned bores 142 of the main frame 30) aligns the bores 95 of the ramps 22 with the bore 82 (and thus the bore 100 of the beam 50). The ramps 22 are secured to the main frame 30 by bolts 110 (one shown) extending through the aligned bores of the ramps 22, 24, the main frame 30 and the axle assemblies 32,34. The bolts 110 are secured by conventional nuts 112.

As previously explained, the axle assemblies 32, 34 are moved outwardly from the center 20 of the dolly 10 to accommodate a wider width vehicle. The ramps 22, 24 are mountable to the dolly 10 in either position when the axle assemblies 32, 34 are mounted outwardly. When it is desired to have the ramps 22, 24 moved outwardly from the center 20 to accommodate a wider width vehicle, (bores 144 aligned with bores 140) the bores 95 of the ramps 22, 24 are aligned with the bores 80 of the main frame 30. The axle assemblies 32, 34 moved outwardly for the wider width vehicle, aligns the bore 100 of the beam 50 with the bore 80 in the main frame 30. The ramps 22, 24 are fixedly mounted to the main frame 30 by bolts 110 fitted in the aligned bores of the ramps 22, 24, the main frame 30 and the axles assemblies 32, 34 and secured by nuts 112.

When it is desired to move the ramps inwardly toward the center 20 while retaining the axle assemblies 32, 34 mounted in their outward positions, the bores 94 of the ramps 22, 24 will be aligned with the bore 80 of the main frame 30 and the bore 100 of the axle assemblies 32, 34. The bore 96 will be aligned with the bore 84 of the main frame 30 and the bore 102 of the axle assemblies 32, 34. The patterned bores 144 of the ramps 22, 24 will be aligned with the patterned bores 142 of the main frame 30. The ramps 22, 24 are fixedly mounted to the main frame 30 by bolts 110 fitted in the aligned bores of the ramps 22, 24, the main frame 30 and the axles assemblies 32, 34 and secured by nuts 112. It will be appreciated that where only one of the bores 94, 95, 96 of the ramps are aligned with the bores 80 through 90 of the main frame and a corresponding bore of the axle, the second bolt otherwise residing in the other of the bores 94, 95 96 may be inserted outside the ramp through aligned bores of the axle and frame.

The dolly 10, as explained in the mounting arrangement of the ramps and the axle assemblies, is arranged to accommodate a range of vehicle widths. A user thus has the capability of adjusting the dolly 10 to the vehicle that will be towed by another vehicle.

The hitch 12 is pivotally mounted to the main frame 30 of the dolly 10 which permits the ramps 22, 24 to be tilted downwardly for moving a vehicle onto the ramps 22, 24 as illustrated in FIG. 4. A latch mechanism 150 is provided on the main frame 30 to release the hitch 12 from the main frame 30 and also to secure the hitch 12 in its operating position as shown in FIG. 5.

Those skilled in the art will recognize that modifications and variations may be made without departing from the true spirit and scope of the invention. The invention is therefore not to be limited to the embodiments described and illustrated but is to be determined from the appended claims.

I claim:

1. An adjustable tow dolly for a vehicle comprising:

an integral main frame, a pair of wheels, a wheel axle for each wheel, said main frame extended substantially the distance between said wheels, a pair of ramps mounted to and extended rearwardly from the frame, and a hitch connected to and extended centrally from the main frame in a forward direction;

a formed channel extended laterally from each side into said main frame and sized to accommodate the wheel axles of said pair of wheels, said axles mountable in said channels at an inner position and an outer position whereby the wheels are spaced closer together and farther apart, respectively, said axles extended into said channel in either position to substantially the center of the main frame to substantially maximize overlap as between the channel and the axles;

removable fasteners selectively fastening said axles at said inner position and said outer position; and said wheels pivotally mounted to the axles about a vertical pivot to allow turning of the wheels relative to the axles and main frame, and a tie rod coupling the wheels together, said tie rod comprising adjustable sections having adjustment positions and fasteners securing the sections at said adjustment positions for adjusting the length of the tie rod to match the inner and outer positions of the wheels.

2. An adjustable tow dolly as defined in claim 1 wherein the pair of ramps are movably mounted to said main frame laterally between inner and outer positions for accommodating different wheel widths of vehicles to be towed, and removable fasteners for selectively fastening the ramps at said inner and outer positions.

3. An adjustable tow dolly as defined in claim 1 wherein the removable fasteners comprise:

said main frame provided with a first plurality of bores extended laterally through the channels thereof and a second plurality of bores extended vertically through the channels, said axles provided with a pair of lateral bores and a pair of vertical bores mated to the first and second plurality of bores of the main frame whereby each of said pair of bores in the axle are aligned with a pair of bores of each of said plurality of bores in the main frame at the inner position, and with a different pair of bores of said first and second plurality of bores in the main frame at the outer position, and removable bolts sized to extend into and through the aligned bores for securing said axles to the main frame at the inner and outer positions.

4. An adjustable tow dolly as defined in claim 3 wherein said ramps each have a pattern of bores mated for alignment with different pairs of vertically extended bores in the main frame for securement of the ramp at inner and outer positions.

5. An adjustable tow dolly for a vehicle comprising:

an integral main frame, a pair of wheels, a wheel axle for each wheel, said wheels mounted to the axles about a vertical pivot to allow turning of the wheels relative to the axles and said main frame as mounted to said axles for towing being in a fixed relationship with said axles, a pair of ramps and a hitch connected to and extended centrally from the main frame in a forward direction;

said main frame extended substantially the distance between the wheels, said ramps fixedly securable to said main frame at alternate positions, a first position for narrow vehicles and a second position for wide vehicles;

said hitch pivotally connected to the main frame whereby the main frame can be pivoted vertically about the wheel axle and relative to said hitch to lower the ramps and raise the ramps for loading a vehicle, and a lock mechanism to releasably lock the main frame to the hitch in the raised position.

6. An adjustable tow dolly as defined in claim 5 wherein the axles are securable to the main frame at alternate positions, a first position for narrow vehicles and a second position for wide vehicles.

\* \* \* \* \*